(12) United States Patent
Yamada et al.

(10) Patent No.: US 12,674,993 B2
(45) Date of Patent: Jul. 7, 2026

(54) VEHICLE DISPLAY DEVICE

(71) Applicant: YAZAKI CORPORATION, Tokyo (JP)

(72) Inventors: Yoshihisa Yamada, Makinohara (JP); Terukazu Kuboyama, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 187 days.

(21) Appl. No.: 18/827,661

(22) Filed: Sep. 6, 2024

(65) Prior Publication Data

US 2024/0427160 A1     Dec. 26, 2024

Related U.S. Application Data

(63) Continuation of application No. PCT/JP2023/032271, filed on Sep. 4, 2023.

(30) Foreign Application Priority Data

Sep. 29, 2022     (JP) ................................. 2022-155909

(51) Int. Cl.
G02B 27/01          (2006.01)
B60K 35/231          (2024.01)

(52) U.S. Cl.
CPC ........ G02B 27/0179 (2013.01); B60K 35/231 (2024.01); G02B 27/0101 (2013.01); (Continued)

(58) Field of Classification Search
CPC ............ G02B 27/0179; G02B 27/0101; G02B 27/0149; G02B 27/0154; G02B 27/0181; B60K 35/231; B60K 2360/23
(Continued)

(56) References Cited

U.S. PATENT DOCUMENTS 10,852,538 B2 * 12/2020 Watanabe ................ G02B 5/30
2005/0040940 A1 * 2/2005 Sonobe .................. B60K 35/60
359/630
(Continued)

FOREIGN PATENT DOCUMENTS

JP          2008-296635 A          12/2008
JP          2013-119286 A          6/2013
(Continued)

OTHER PUBLICATIONS

International Search Report for PCT/JP2023/032271 dated Nov. 14, 2023.

*Primary Examiner* — Sharrief I Broome
(74) *Attorney, Agent, or Firm* — KENEALY VAIDYA LLP

(57)          ABSTRACT

A vehicle display device includes: an image display device; a hood part; a combiner disposed on an eye point side with respect to an upper display region; a housing part that houses a lower display region and has an opening; a reflection member that is disposed inside the housing part, is opposed to the combiner via the opening, and reflects display light of the lower display region toward the combiner; a motor that adjusts a position of a virtual image based on an image in the lower display region in an image vertical direction by rotating the reflection member; and a control unit that controls the image display device and the motor. The control unit is configured to be able to adjust, to a predetermined position determined in advance, a relative position of a virtual image with respect to the upper display region when viewed from the eye point.

1 Claim, 7 Drawing Sheets

(52) U.S. Cl.
CPC ...... G02B 27/0149 (2013.01); *B60K 2360/23*
(2024.01); *G02B 2027/0154* (2013.01); *G02B*
*2027/0181* (2013.01)

(58) Field of Classification Search
USPC ......................................................... 359/630
See application file for complete search history.

(56) References Cited

U.S. PATENT DOCUMENTS

| | | | | |
|---|---|---|---|---|
| 2005/0259034 | A1* | 11/2005 | Harada | ............. G02B 27/0101 |
| | | | | 345/7 |
| 2017/0320390 | A1* | 11/2017 | Sato | ....................... G02B 27/01 |
| 2018/0370362 | A1* | 12/2018 | Watanabe | ............. G02B 27/01 |
| 2021/0370775 | A1 | 12/2021 | Yamada | |

FOREIGN PATENT DOCUMENTS

| | | | |
|---|---|---|---|
| JP | 2020-154004 | A | 9/2020 |
| JP | 2021-187429 | A | 12/2021 |

* cited by examiner

VEHICLE DISPLAY DEVICE

CROSS-REFERENCE TO RELATED APPLICATION(S)

This application is a continuation application of International Application No. PCT/JP2023/032271 filed on Sep. 4, 2023 which claims the benefit of priority from Japanese Patent Application No. 2022-155909 filed on Sep. 29, 2022 and designating the U.S., the entire contents of which are incorporated herein by reference.

BACKGROUND OF THE INVENTION

1. Field of the Invention

The present invention relates to a vehicle display device.

2. Description of the Related Art

In the related art, there is known a vehicle display device including a combiner. Japanese Patent Application Laid-open No. 2013-119286 discloses a vehicle display device including: a display device main body that emits display light; and a combiner that is fixed to an upper part of the display device main body, the combiner onto which the display light emitted from the display device main body is projected. The combiner in Japanese Patent Application Laid-open No. 2013-119286 includes a display region onto which the display light is projected, and a transparent transmission part disposed at least on one side of this display region. On a back surface side of the transparent transmission part of the combiner, an image display unit that displays an image is disposed.

It is preferable to improve visibility in a case of displaying a real image and a virtual image using a combiner. For example, in a case of arranging and displaying the real image and the virtual image side by side in an image vertical direction, if a relative position of the virtual image with respect to the real image varies depending on a position of an eye, the visibility may be lowered.

In a configuration of displaying the real image and the virtual image using the combiner, it is preferable that a required height of the combiner can be reduced. For example, in a case of enabling the virtual image to be visually recognized from different positions in a height direction, the height of the combiner should be increased. However, if the height of the combiner is increased, a size of a device is also increased.

SUMMARY OF THE INVENTION

An object of the present invention is to provide a vehicle display device that can improve the visibility.

Another object of the present invention is to provide a vehicle display device that can reduce the required height of the combiner.

In order to achieve the above mentioned object, a vehicle display device according to one aspect of the present invention includes an image display device that includes an upper display region and a lower display region for displaying an image, and is disposed so that the upper display region is opposed to an eye point in a vehicle; a hood part that covers the upper display region from a vehicle-front side; a combiner disposed on the eye point side with respect to the upper display region; a housing part that houses the lower display region and has an opening facing upward, the opening being positioned on the eye point side with respect to the image display device; a reflection member that is disposed inside the housing part, is opposed to the combiner via the opening, and reflects display light of the lower display region toward the combiner; a motor that adjusts a position of a virtual image based on an image in the lower display region in an image vertical direction by rotating the reflection member; and a control unit that controls the image display device and the motor, wherein the control unit positions the reflection member so that a line of sight in a case of viewing the virtual image from the eye point at a first position in a vehicle upper and lower direction intersects with a line of sight in a case of viewing the virtual image from the eye point at a second position in the vehicle upper and lower direction at a position between the combiner and the upper display region.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a vehicle display device according to embodiments of the present invention in detail with reference to the drawings. The present invention is not limited to the embodiments. Constituent elements in the following embodiments encompass a constituent element that is easily conceivable by those skilled in the art, or substantially the same constituent element.

First Embodiment

Figure 1:
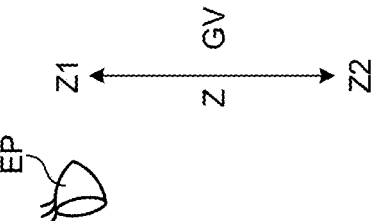
FIG. 1 is a cross-sectional view of a vehicle display device according to a first embodiment.
Figure 2:
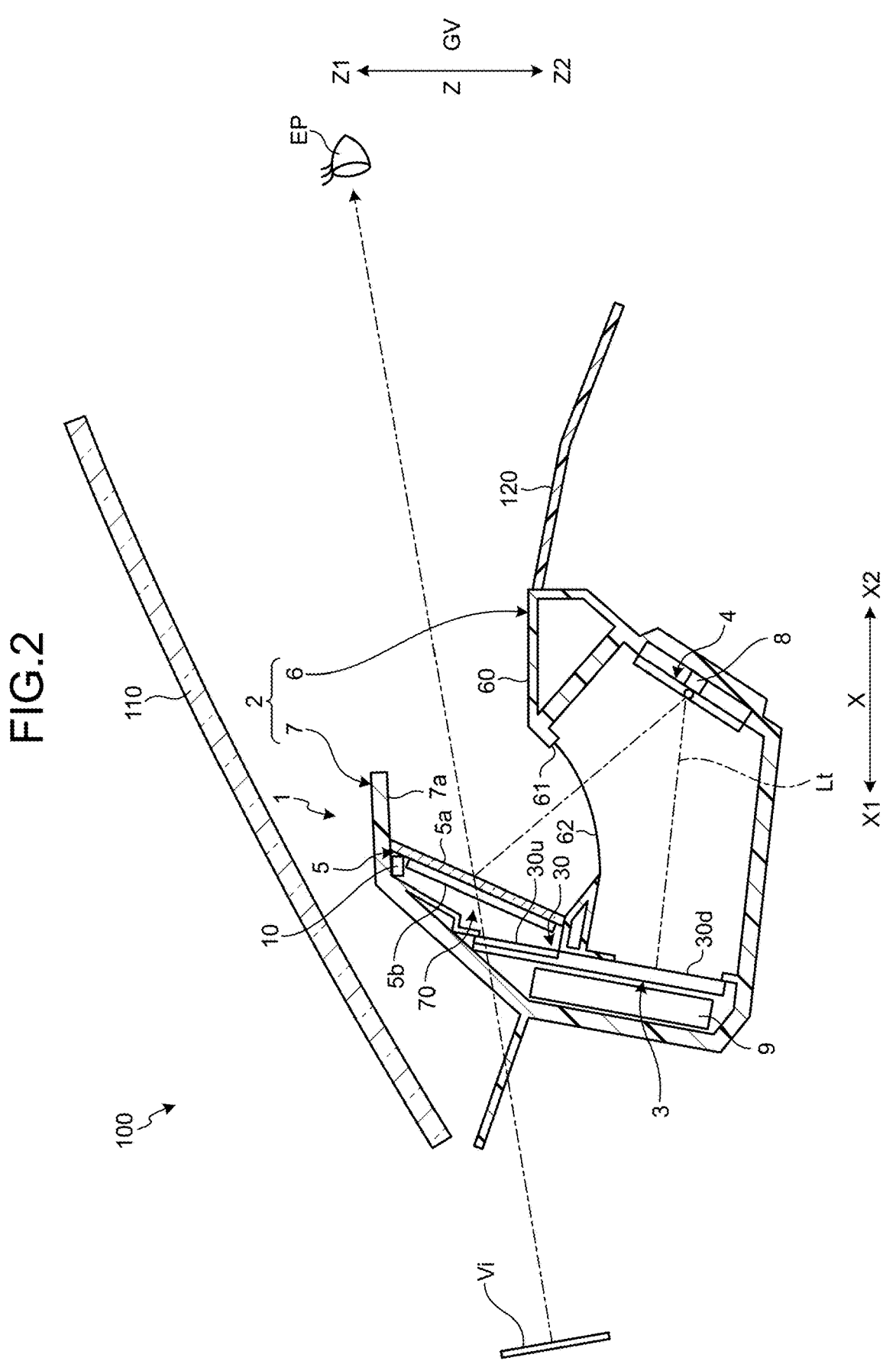
FIG. 2 is a diagram illustrating an optical path of display light according to the first embodiment.
Figure 3:
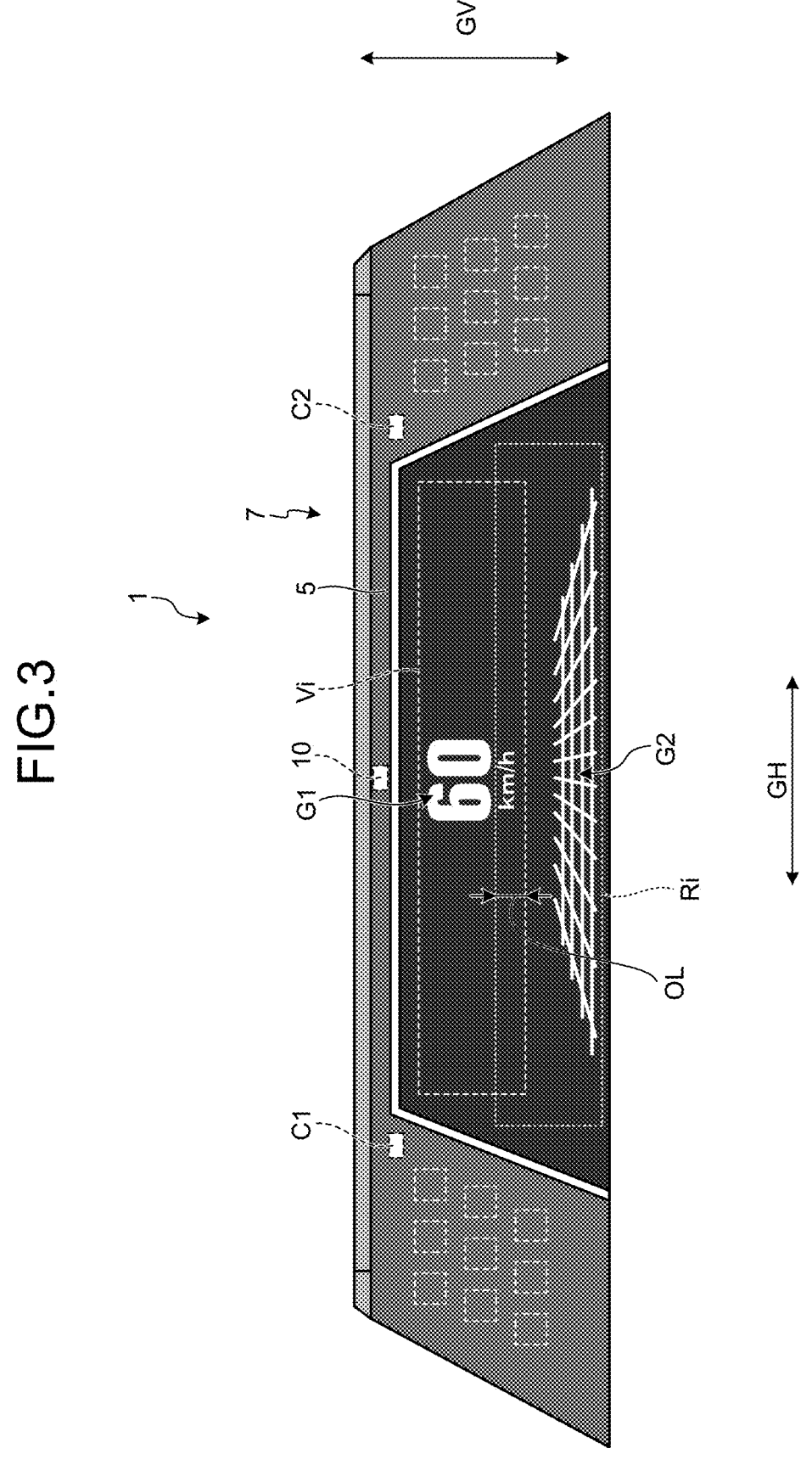
FIG. 3 is a diagram illustrating a display image in the first embodiment.
Figure 4:
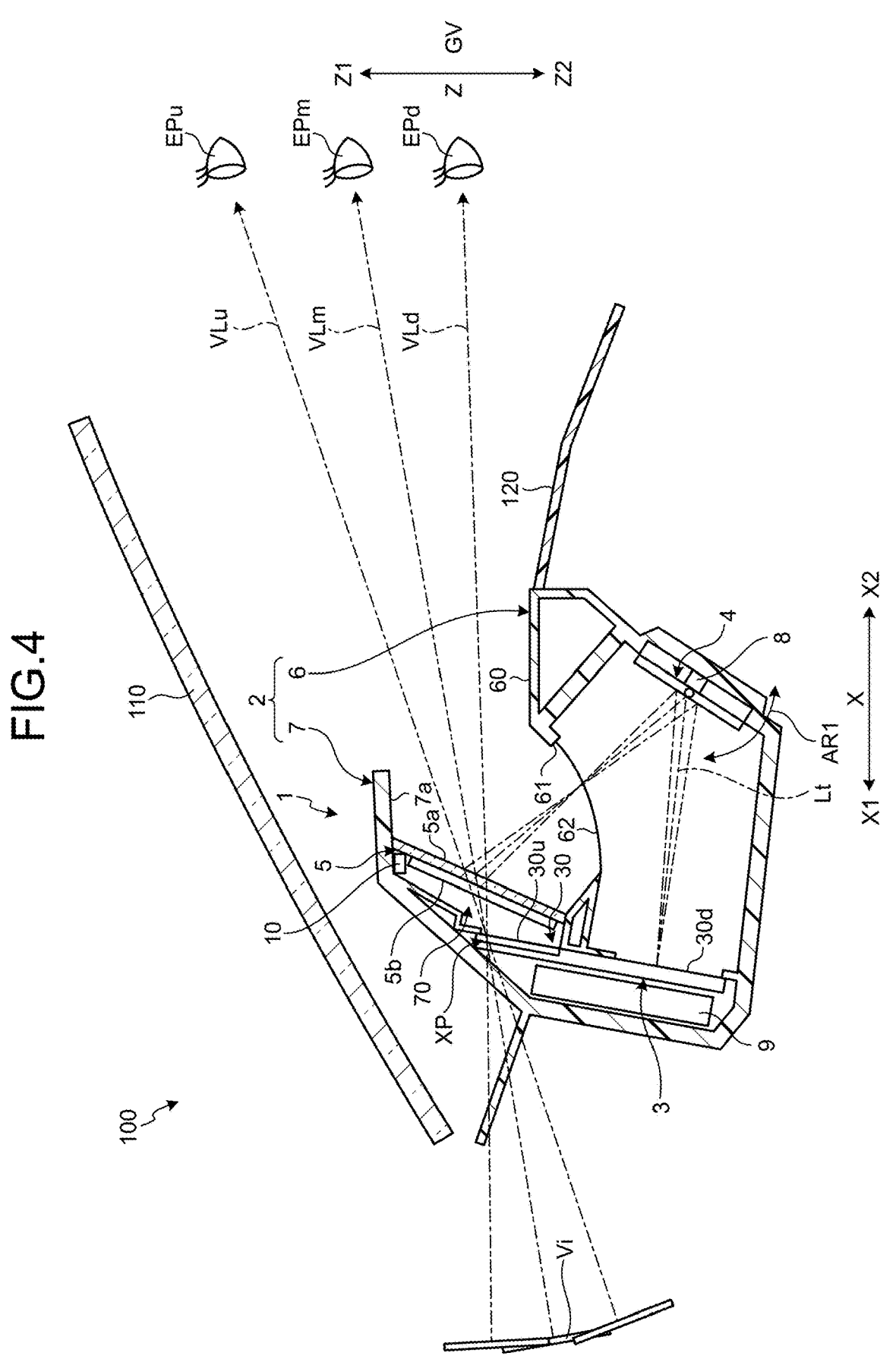
FIG. 4 is a diagram illustrating an intersection point of lines of sight in the first embodiment.
Figure 5:
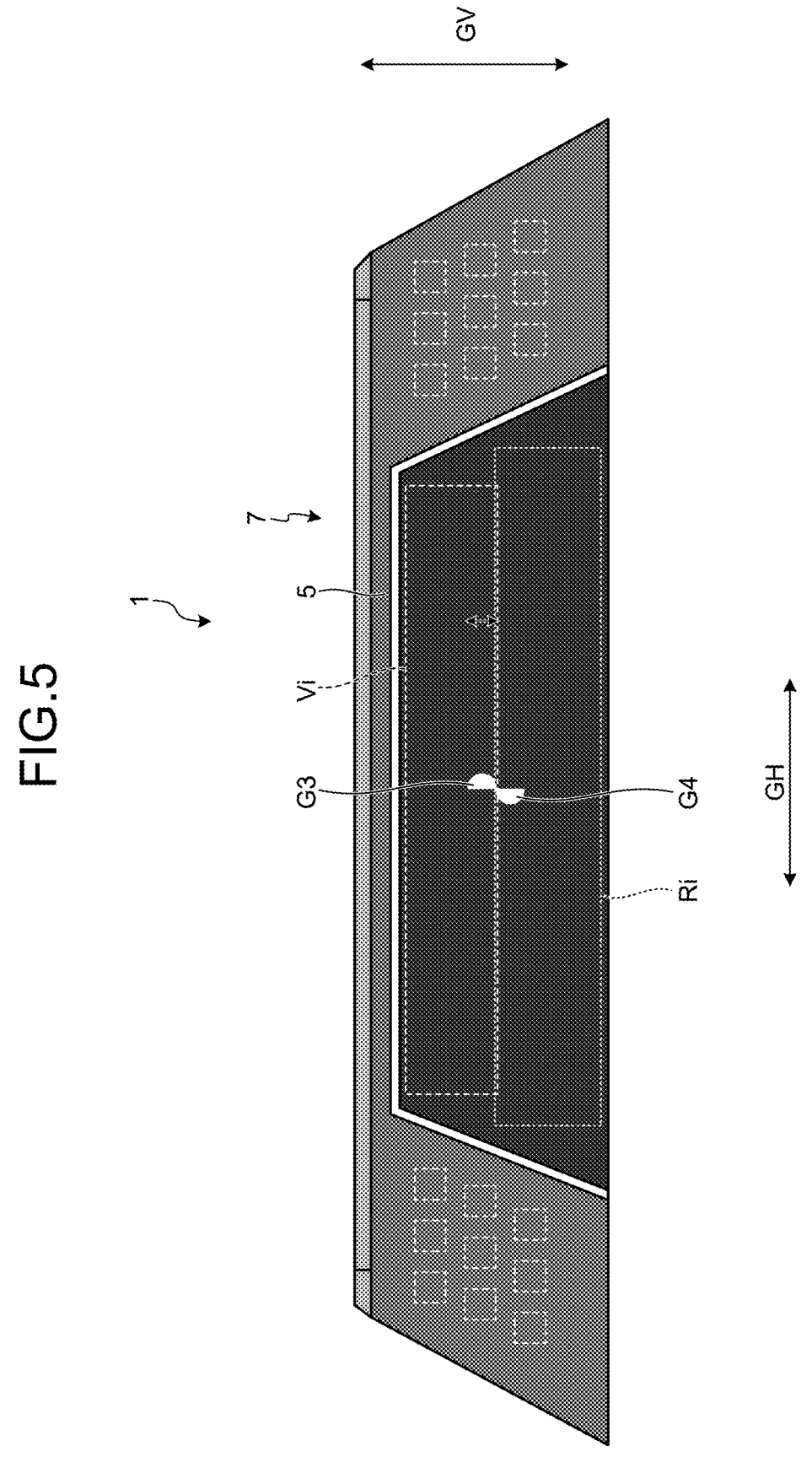
FIG. 5 is a diagram illustrating images for positioning according to the first embodiment.
Figure 6:
FIG. 6 is a diagram illustrating images for positioning according to the first embodiment.

The following describes a first embodiment with reference to FIG. 1 to FIG. 6. The present embodiment relates to a vehicle display device. FIG. 1 is a cross-sectional view of the vehicle display device according to the first embodiment, FIG. 2 is a diagram illustrating an optical path of display light according to the first embodiment, FIG. 3 is a diagram illustrating a display image in the first embodiment, FIG. 4 is a diagram illustrating an intersection point of lines of sight in the first embodiment, and FIG. 5 and FIG. 6 are diagrams illustrating images for positioning according to the first embodiment.

As illustrated in FIG. 1, a vehicle display device 1 according to the present embodiment includes a housing 2, an image display device 3, a reflection member 4, a combiner 5, a motor 8, a control unit 9, and a camera 10. The vehicle display device 1 is mounted on a vehicle 100 such as an automobile. The vehicle display device 1 according to the present embodiment is a meter device that can cause the combiner 5 to display a virtual image in front of a driver. The exemplified vehicle display device 1 is disposed on an instrument panel 120.

The vehicle display device 1 according to the present embodiment is configured to display a real image and a virtual image for an eye point EP in the vehicle 100. More specifically, the vehicle display device 1 causes the driver to visually recognize, as a real image, an image displayed on an upper part of the image display device 3, and causes the driver to visually recognize, as a virtual image, an image displayed on a lower part of the image display device 3. The eye point EP is a position of an eye of the driver, and detected by the camera 10, for example.

The housing 2 includes a housing part 6 and a hood part 7. The housing part 6 and the hood part 7 may be integrated with each other, or may be separate members. The housing part 6 is housed in the instrument panel 120. The housing part 6 has a box shape, and has a light shielding property. The housing part 6 has an opening 61 opening upward. The opening 61 is positioned on an upper part of the housing part 6. The opening 61 is positioned on a rear side X2 with respect to the image display device 3, that is, on the eye point EP side.

A transparent cover 62 is disposed on the opening 61. The cover 62 blocks the opening 61. A shape of the cover 62 is a curved shape curving toward an inner side of the housing part 6. The cover 62 is formed to reflect external light toward a light shielding wall. For example, the cover 62 reflects external light transmitted through a windshield 110 toward a wall surface of the hood part 7 or a direction other than the eye point.

In the following description, a front side in a vehicle front and rear direction X is referred to as a "front side X1", and the rear side in the vehicle front and rear direction X is referred to as the "rear side X2". An upper side in a vehicle upper and lower direction z is referred to as an "upper side Z1", and a lower side in the vehicle upper and lower direction Z is referred to as a "lower side Z2". An image vertical direction of an image displayed by the vehicle display device 1 corresponds to the vehicle upper and lower direction Z.

The image display device 3 is a device that displays an image, for example, a liquid crystal display device such as a Thin Film Transistor-Liquid Crystal Display (TFT-LCD). The image display device 3 includes a backlight unit, and outputs display light by light of the backlight unit. As illustrated in FIG. 1, the image display device 3 includes an upper display region 30$u$ and a lower display region 30$d$. The upper display region 30$u$ and the lower display region 30$d$ are light emitting regions that output display light. The upper display region 30$u$ is positioned on the upper side Z1 of a display surface 30 of the image display device 3. The lower display region 30$d$ is positioned on the lower side Z2 of the display surface 30.

The image display device 3 is disposed so that the upper display region 30$u$ is opposed to the eye point EP. The image display device 3 is, for example, fixed to the housing 2, and held by the housing 2. As illustrated in FIG. 1, the housing part 6 houses the lower display region 30$d$ and holds the image display device 3. The image display device 3 is disposed at an end part on the front side X1 of the housing part 6, and the display surface 30 is oriented toward the rear side X2. The upper display region 30$u$ projects upward from the housing part 6. The upper display region 30$u$ is housed in an internal space of the hood part 7. The hood part 7 has a light shielding property, and covers the upper display region 30$u$ from a vehicle-front side. The hood part 7 is formed to be able to shield the upper display region 30$u$ from external light.

As illustrated in FIG. 1, the combiner 5 is disposed to cover an internal space 70 of the hood part 7. That is, the combiner 5 is disposed to shield the internal space 70 when viewed from the eye point EP. The upper display region 30$u$ of the image display device 3 is positioned in back of the combiner 5 when viewed from the eye point EP. In other words, the combiner 5 is disposed on the eye point EP side with respect to the upper display region 30$u$.

The combiner 5 is, for example, constituted of a half mirror. The combiner 5 is a reflection member that can transmit light incident from a back surface side, and can reflect light incident from a front surface side. The combiner 5 includes a reflection surface 5$a$ opposed to the eye point EP. The reflection surface 5$a$ is disposed on any of a front surface of the combiner 5 facing the eye point EP side or a back surface facing an opposite side of the eye point EP side. The reflection surface 5$a$ is subjected to coating processing and the like for reflecting light toward the eye point EP side. A reflection suppressing part 5$b$ is disposed on the back surface side of the combiner 5. The reflection suppressing part 5$b$ suppresses reflection of display light of the upper display region 30$u$ toward the front side X1. The reflection suppressing part 5$b$ may be obtained by surface treatment to suppress reflection on the combiner 5, or may be a sheet attached to the combiner 5.

As illustrated in FIG. 1, the reflection member 4 is disposed inside the housing part 6, and opposed to the reflection surface 5$a$ of the combiner 5 via the opening 61. The reflection member 4 is disposed at an end part on the rear side X2 of the housing part 6, and opposed to the lower display region 30$d$. The reflection member 4 is, for example, a plane mirror. As illustrated in FIG. 2, the reflection member 4 reflects display light Lt output from the lower display region 30$d$ toward the combiner 5. The reflection surface 5$a$ of the combiner 5 reflects the display light Lt from the lower display region 30$d$ toward the eye point EP. A virtual image Vi visually recognized at the eye point EP is formed at a position on the front side X1 with respect to the reflection surface 5$a$. The virtual image Vi is a virtual image of the lower display region 30$d$, and includes an image displayed in the lower display region 30$d$.

The reflection member 4 according to the present embodiment is supported in a rotatable manner. A rotation direction of the reflection member 4 is a direction for changing an inclination angle of the reflection member 4 with respect to the vehicle upper and lower direction Z as indicated by an arrow AR1 in FIG. 1. As the inclination angle of the reflection member 4 is increased, a projection position of an image on the combiner 5 moves upward. On the other hand, as the inclination angle of the reflection member 4 is decreased, the projection position of the image on the combiner 5 moves downward. The motor 8 rotates the reflection member 4 to adjust the inclination angle of the reflection member 4 to be a desired angle. The motor 8 is, for example, a stepping motor.

The control unit 9 controls the image display device 3 and the motor 8. The control unit 9 is, for example, a computer including an arithmetic unit, a memory, a communication interface, and the like. The control unit 9 controls the motor 8 and the image display device 3 in accordance with a computer program stored in advance, for example.

The camera 10 images the driver to detect the position of the eye point EP. The exemplified camera 10 is disposed at the center (or on the left and the right, for example) of an upper part in a meter display unit, and installed to be able to image the driver. The camera 10 is, for example, disposed at a position illustrated in FIG. 3. The position of the exemplified camera 10 is a center part in an image horizontal direction GH, and an upper part in an image vertical direction GV. The position of the camera 10 may be a position C1 or a position C2 illustrated in FIG. 3. The position of the eye point EP in the vehicle upper and lower direction Z is detected by image recognition on an image generated by the camera 10. The camera 10 may calculate the position of the eye point EP in a vehicle width direction. The camera 10 can output coordinate values of the detected eye point EP.

FIG. 3 illustrates an example of the real image Ri and the virtual image Vi to be displayed. The real image Ri is an image displayed in the upper display region 30u of the image display device 3. The virtual image Vi is a virtual image generated by the display light Lt of the lower display region 30d. That is, the virtual image Vi is an image that is visually recognized with the display light Lt reflected toward the eye point EP by the reflection member 4 and the combiner 5. The virtual image Vi is displayed on the upper side in the image vertical direction GV with respect to the real image Ri. The virtual image Vi includes, for example, a meter image G1 indicating a traveling speed of the vehicle 100. The real image Ri includes, for example, an image producing a sense of depth and a sense of three-dimensionality of a background image G2 and the like. The virtual image Vi mainly displays vehicle information, and the real image Ri displays a perspective background image and the like to enable display with a sense of floating and a sense of depth.

The vehicle display device 1 according to the present embodiment superimposes part of the real image Ri on part of the virtual image Vi to be displayed. More specifically, a lower part of the virtual image Vi in the image vertical direction GV is superimposed on an upper part of the real image Ri in the image vertical direction GV. The virtual image Vi includes a superimposed range OL overlapping the real image Ri. In the display image illustrated in FIG. 3, a relative position of the virtual image Vi with respect to the real image Ri is a predetermined position determined in advance. The relative position of the virtual image Vi with respect to the real image Ri is a relative position in the image vertical direction GV. The predetermined position described above is a position where a width of the superimposed range OL becomes a prescribed value. The superimposed range OL at the predetermined position may be ⅓ of a height of the virtual image Vi, or may be ⅓ of a height of the real image Ri.

When the position of the virtual image Vi is the predetermined position, the relative position of design of the virtual image Vi with respect to design of the real image Ri becomes optimum. For example, in FIG. 3, the meter image G1 is positioned on the upper side with respect to the background image G2, and the meter image G1 does not overlap the background image G2. That is, the background image G2 does not interfere with the meter image G1, and does not inhibit visibility of the meter image G1. The relative position of the meter image G1 with respect to the background image G2 in the image vertical direction GV is an optimum position where a sense of depth and a sense of floating can be produced.

As described below, the vehicle display device 1 according to the present embodiment can cause the width of the superimposed range OL to be a constant size irrespective of the position of the eye of the driver. In other words, the vehicle display device 1 is configured to be able to adjust, to the predetermined position, the relative position of the virtual image Vi with respect to the real image Ri in the image vertical direction GV.

The control unit 9 automatically adjusts the inclination angle of the reflection member 4 in accordance with the detected position of the eye point EP, for example. In this case, the control unit 9 drives the motor 8 based on the position of the eye point EP in the vehicle upper and lower direction Z acquired from the camera 10. It is preferable that the vehicle display device 1 previously stores a table indicating a correspondence relation between the position of the eye point EP in the vehicle upper and lower direction Z and a target inclination angle of the reflection member 4. The control unit 9 determines the target inclination angle of the reflection member 4 based on the acquired position of the eye point EP. The control unit 9 causes the motor 8 to rotate the reflection member 4 to cause the inclination angle of the reflection member 4 to be the target inclination angle. The previously stored table is, for example, determined to be able to perform adjustment as follows.

FIG. 4 illustrates an upper end position EPu, a center position EPm, and a lower end position EPd as positions of the eye point EP. Among the three positions EPu, EPm, and EPd, the upper end position EPu is positioned on the most upper side Z1 in the vehicle upper and lower direction Z. The upper end position EPu is, for example, a position at an upper end of an eye range of the vehicle 100. The lower end position EPd is positioned on the most lower side Z2 among the three positions EPu, EPm, and EPd. The lower end position EPd is, for example, a position at a lower end of the eye range. The center position EPm is a center position between the upper end position EPu and the lower end position EPd.

FIG. 4 illustrates a line of sight VLu corresponding to the upper end position EPu, a line of sight VLm corresponding to the center position EPm, and a line of sight VLd corresponding to the lower end position EPd. The line of sight VLu is a line of sight in a case of viewing the virtual image Vi from the eye point EP at the upper end position EPu. In other words, the line of sight VLu is an optical path of the display light Lt traveling from the combiner 5 toward the upper end position EPu. The line of sight VLm is a line of sight in a case of viewing the virtual image Vi from the eye point EP at the center position EPm. The line of sight VLd is a line of sight in a case of viewing the virtual image Vi from the eye point EP at the lower end position EPd.

The lines of sight VLu, VLm, and VLd illustrated in FIG. 4 correspond to the same pixel in the lower display region 30d. The lines of sight VLu, VLm, and VLd correspond to a center pixel in the lower display region 30d, for example. In this case, the line of sight VLu corresponds to an optical path along which the display light Lt of the center pixel travels toward the upper end position EPu. Similarly, the line of sight VLm corresponds to an optical path along which the display light Lt of the center pixel travels toward the center position EPm, and the line of sight VLd corresponds to an optical path along which the display light Lt of the center pixel travels toward the lower end position EPd.

The lines of sight VLu, VLm, and VLd illustrated in FIG. 4 intersect with each other at an intersection point XP. The control unit 9 according to the present embodiment controls the motor 8 to position the intersection point XP at the position of the upper display region 30u. In other words, the control unit 9 positions the reflection member 4 so that the lines of sight VLu, VLm, and VLd intersect with each other at the position on the upper display region 30u. Due to this, the relative position of the virtual image Vi with respect to the upper display region 30u becomes constant when viewed from the eye point EP. That is, in a case of viewing the virtual image Vi from different positions in the vehicle upper and lower direction Z, the relative position of the virtual image Vi with respect to the real image Ri becomes the same position in the image vertical direction GV.

The table that enables the control as described above includes the target inclination angle of the reflection member 4 for each of the upper end position EPu, the center position EPm, and the lower end position EPd, for example. The target inclination angle may be calculated by linear interpolation and the like for the eye point EP between the upper end position EPu and the center position EPm. The target inclination angle may be calculated by linear interpolation and the like for the eye point EP between the center position EPm and the lower end position EPd. Alternatively, the table may include the target inclination angle for each of a plurality of positions different from all of the upper end position EPu, the center position EPm, and the lower end position EPd. In this case, the target inclination angle at a position closest to the detected position of the eye point EP may be used.

The intersection point XP may be positioned on a display surface of the upper display region 30u, or may be positioned on an extension line of the display surface of the upper display region 30u. In other words, the intersection point XP may be positioned on a plane including the display surface of the upper display region 30u.

The vehicle display device 1 according to the present embodiment can improve visibility of the image by causing the relative position of the virtual image Vi with respect to the real image Ri to be constant. As a comparative example, in a case in which the reflection member 4 is fixed, the relative position of the virtual image Vi with respect to the real image Ri varies depending on the position of the eye. In this case, as described below, the visibility of the display image may be lowered.

For example, in a case of a driver with low stature, the position of the virtual image Vi viewed from the eye point EP becomes a position on the lower side, and a wrapping amount of the virtual image Vi for the real image Ri is increased. In this case, the meter image G1 may overlap the background image G2, and visibility of the meter image G1 may be lowered. On the other hand, in a case of a driver with high stature, the position of the virtual image Vi viewed from the eye point EP becomes a position on the upper side, and the wrapping amount of the virtual image Vi for the real image Ri is reduced. In this case, the position of the meter image G1 may be deviated from an optimum position, and the visibility of the meter image G1 may be lowered. Additionally, the meter image G1 is too far away from the background image G2, and balance of the display image is lost.

In contrast, with the vehicle display device 1 according to the present embodiment, the position of the virtual image Vi with respect to the real image Ri is adjusted to be the optimum position. Thus, the vehicle display device 1 according to the present embodiment can improve the visibility of the display image.

The control unit 9 may adjust the position of the virtual image Vi in response to operation input by the driver. In this case, the control unit 9 may cause the image display device 3 to display images G3 and G4 for positioning as illustrated in FIG. 5. The image G3 is an image included in the virtual image Vi, and displayed in the lower display region 30d. The image G4 is an image included in the real image Ri, and displayed in the upper display region 30u. The exemplified images G3 and G4 are images having a semicircular shape.

The control unit 9 prompts the driver to perform adjustment operation so that the two images G3 and G4 constitute one circle. The driver adjusts the position of the virtual image Vi in the image vertical direction GV by performing operation input for an operation member such as a switch. The control unit 9 rotates the reflection member 4 by driving the motor 8 in response to the operation input by the driver. FIG. 6 illustrates a state in which adjustment of the position of the virtual image Vi is completed. The position of the virtual image Vi viewed from the driver is a regular position, and the two images G3 and G4 constitute one circle.

At this point, a line of sight of the driver viewing the virtual image Vi passes through the intersection point XP when viewed from the vehicle width direction. That is, the line of sight of the driver viewing the virtual image Vi intersects with the lines of sight VLu, VLm, and VLd illustrated in FIG. 4 in the upper display region 30u. In this way, the control unit 9 can adjust, to the predetermined position, the relative position of the virtual image Vi with respect to the upper display region 30u when viewed from the eye point EP based on the operation by the driver.

The shape of the images G3 and G4 for positioning is not limited to the exemplified semicircular shape. The images G3 and G4 for positioning may be images that constitute a triangle or a quadrangle when positioning is performed, for example. Each of the images G3 and G4 for positioning may be a line segment along the image horizontal direction GH, for example. In this case, the images G3 and G4 are displayed so that the positions thereof in the image vertical direction GV agree with each other in a case in which the position of the virtual image Vi is the regular position.

As described above, the vehicle display device 1 according to the present embodiment includes the image display device 3, the hood part 7, the combiner 5, the housing part 6, the reflection member 4, the motor 8, and the control unit 9. The image display device 3 includes the upper display region 30u and the lower display region 30d for displaying an image. The image display device 3 is disposed so that the upper display region 30u is opposed to the eye point EP in the vehicle 100. The hood part 7 covers the upper display region 30u from the vehicle-front side. The combiner 5 is disposed on the eye point EP side with respect to the upper display region 30u. The housing part 6 houses the lower display region 30d, and has the opening 61 that faces upward. The opening 61 is positioned on the eye point EP side with respect to the image display device 3.

The reflection member 4 is disposed inside the housing part 6, and opposed to the combiner 5 via the opening 61. The reflection member 4 reflects the display light Lt of the lower display region 30d toward the combiner 5. The motor 8 adjusts the position of the virtual image Vi based on the image in the lower display region 30d in the image vertical direction GV by rotating the reflection member 4. The control unit 9 controls the image display device 3 and the motor 8.

The control unit 9 is configured to be able to adjust, to the predetermined position determined in advance, the relative position of the virtual image Vi with respect to the upper display region 30u when viewed from the eye point EP. The vehicle display device 1 according to the present embodiment can improve the visibility of the display image by adjusting, to be the predetermined position determined in advance, the relative position of the virtual image Vi with respect to the real image Ri.

When the reflection member 4 is controlled so that the relative position of the virtual image Vi with respect to the real image Ri does not vary, an optical path range of the display light Lt is reduced. In a case in which the reflection member 4 is fixed, the optical path range in the image vertical direction GV is required to be widened so that the image is not partly cut off irrespective of the position of the eye in the vehicle upper and lower direction Z. In contrast, with the vehicle display device 1 according to the present embodiment, the required optical path range can be narrowed, and the combiner 5 and the cover 62 can be downsized. When the combiner 5 and the cover 62 are downsized, an incident range of external light is narrowed, and the visibility is prevented from being lowered due to influence of incidence of external light. When optical paths are bundled in a certain range, a light shielding wall disposed on a lower side of the combiner 5 and peripheral structures thereof are downsized.

The control unit 9 according to the present embodiment positions the reflection member 4 so that lines of sight in a case of viewing the virtual image Vi from different eye points EP intersect with each other at the position on the upper display region 30*u*. For example, assuming that the upper end position EPu is a first position and the center position EPm is a second position, the control unit 9 positions the reflection member 4 so that the line of sight VLu from the first position intersects with the line of sight VLm from the second position at the position on the upper display region 30*u*. Due to this, the relative position of the virtual image Vi with respect to the real image Ri is adjusted to be the predetermined position. Motor control for positioning the reflection member 4 may be automatically performed based on the acquired position of the eye point EP, or may be performed based on operation by the driver.

The first position is not limited to the upper end position EPu, and the second position is not limited to the center position EPm. The first position is an optional position in a predetermined range in the vehicle upper and lower direction Z, and the second position is an optional position in the predetermined range and is a position different from the first position.

The vehicle display device 1 according to the present embodiment includes an acquisition unit that acquires the position of the eye point EP in the vehicle upper and lower direction Z. The camera 10 is an example of the acquisition unit. The control unit 9 may cause the reflection member 4 to automatically rotate based on the acquired position of the eye point EP. In this case, operation by the driver for adjusting the position of the virtual image Vi is not required.

Second Embodiment

Figure 7:
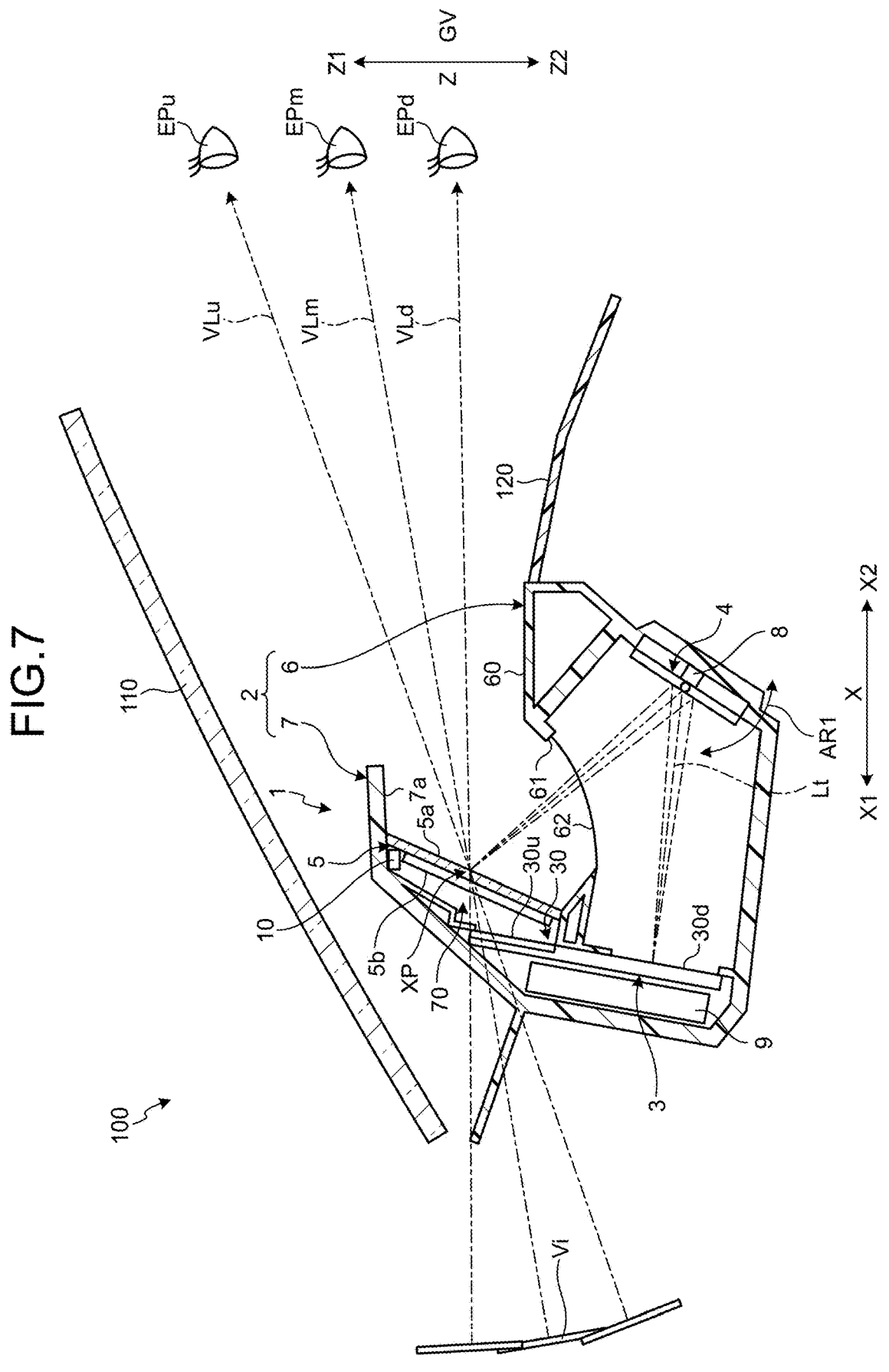
FIG. 7 is a diagram illustrating an intersection point of lines of sight in a second embodiment.

The following describes a second embodiment with reference to FIG. 7. In the second embodiment, a constituent element having the same function as that described in the above first embodiment is denoted by the same reference numeral, and redundant description will not be repeated. FIG. 7 is a diagram illustrating an intersection point of lines of sight in the second embodiment. The control unit 9 according to the second embodiment is configured so that the lines of sight intersect with each other at the combiner 5. FIG. 7 illustrates the lines of sight VLu, VLm, and VLd intersecting with each other at the position on the combiner

5. The position of the intersection point XP is the position of the combiner 5, for example, the position of the reflection surface 5*a*.

The control unit 9 automatically adjusts the inclination angle of the reflection member 4 in accordance with the detected position of the eye point EP, for example. It is preferable that the vehicle display device 1 previously stores a table indicating a correspondence relation between the position of the eye point EP in the vehicle upper and lower direction Z and a target inclination angle of the reflection member 4. In this case, the control unit 9 can determine the target inclination angle of the reflection member 4 based on the table and the acquired position of the eye point EP.

As illustrated in FIG. 7, the target inclination angle is determined so that the lines of sight viewing the virtual image Vi from the eye points EP intersect with each other at the position on the combiner 5. The control unit 9 may adjust the position of the virtual image Vi in response to operation input by the driver. In this case, the control unit 9 may cause images for positioning to be displayed in the real image Ri and the virtual image Vi, respectively. The images for positioning may be the images G3 and G4 illustrated in FIG. 5.

The predetermined position of the virtual image Vi is a position where the lines of sight are caused to intersect with each other at the position of the combiner 5 for a plurality of the eye points EP the positions of which in the vehicle upper and lower direction Z are different. That is, the reflection member 4 is positioned to direct the lines of sight toward the same position at the combiner 5 irrespective of the position of the eye in the vehicle upper and lower direction Z.

When the reflection member 4 is positioned so that the lines of sight intersect with each other at the combiner 5, the display light Lt can be reflected at the same region of the combiner 5 toward the eye point EP irrespective of the position of the eye of the driver. Thus, a required height of the combiner 5 can be minimized.

As described above, the control unit 9 according to the present embodiment positions the reflection member 4 so that the lines of sight in a case of viewing the virtual image Vi from the different eye points EP intersect with each other at the position on the combiner 5. For example, assuming that the center position EPm is the first position and the lower end position EPd is the second position, the control unit 9 positions the reflection member 4 so that the line of sight VLm from the first position intersects with the line of sight VLd from the second position at the position on the combiner 5. Motor control for positioning the reflection member 4 may be automatically performed based on the acquired position of the eye point EP, or may be performed based on operation by the driver.

Modifications of Embodiments

The intersection point XP may be set between the upper display region 30*u* and the combiner 5. For example, in the first embodiment, the intersection point XP may be set to be closer to the combiner 5 side than the upper display region 30*u* when viewed from the eye point EP. As the intersection point XP is caused to be closer to the combiner 5, the required height of the combiner 5 can be reduced. For example, in the second embodiment, the intersection point XP may be set to be closer to the upper display region 30*u* than the combiner 5 when viewed from the eye point EP. As the intersection point XP is caused to be closer to the upper display region 30u, a variation width of the relative position of the virtual image Vi with respect to the real image Ri can be reduced.

The reflection member 4 is not limited to the plane mirror. The reflection member 4 may be a magnifying mirror including a concave reflection surface, for example.

Pieces of the content disclosed in the embodiments and modifications described above can be appropriately combined to be implemented.

A control unit of the vehicle display device according to the present embodiment is configured to be able to adjust, to a predetermined position determined in advance, a relative position of a virtual image with respect to an upper display region when viewed from an eye point. This vehicle display device exhibits an effect of improving visibility.

The control unit of the vehicle display device according to the present embodiment positions a reflection member so that a line of sight in a case of viewing a virtual image from an eye point at a first position in a vehicle upper and lower direction intersects with a line of sight in a case of viewing the virtual image from an eye point at a second position in the vehicle upper and lower direction at a combiner. This vehicle display device exhibits an effect of reducing a required height of the combiner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:

an image display device that includes an upper display region and a lower display region for displaying an image, and is disposed so that the upper display region is opposed to an eye point in a vehicle;

a hood part that covers the upper display region from a vehicle-front side;

a combiner disposed on the eye point side with respect to the upper display region;

a housing part that houses the lower display region and has an opening facing upward, the opening being positioned on the eye point side with respect to the image display device;

a reflection member that is disposed inside the housing part, is opposed to the combiner via the opening, and reflects display light of the lower display region toward the combiner;

a motor that adjusts a position of a virtual image based on an image in the lower display region in an image vertical direction by rotating the reflection member; and a control unit that controls the image display device and the motor, wherein the control unit positions the reflection member so that a line of sight in a case of viewing the virtual image from the eye point at a first position in a vehicle upper and lower direction intersects with a line of sight in a case of viewing the virtual image from the eye point at a second position in the vehicle upper and lower direction at a position between the combiner and the upper display region.

* * * * *